(12) United States Patent
Howard et al.

(10) Patent No.: US 12,518,228 B2
(45) Date of Patent: Jan. 6, 2026

(54) QUANTUM COMPUTATION FOR TRAIN AND DRIVER RECOVERY PROBLEMS

(71) Applicant: Accenture Global Solutions Limited, Dublin (IE)

(72) Inventors: Max Howard, San Francisco, CA (US); Jurgen Albert Weichenberger, Woking (GB); Kung-Chuan Hsu, Cerritos, CA (US); Marcus Alexander Fromm, Zurich (CH); Tim Leonhardt, Munich (DE); Swena Gulati, Mountainside, NJ (US); Shreyas Ramesh, Mountainside, NJ (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1108 days.

(21) Appl. No.: 17/488,665

(22) Filed: Sep. 29, 2021

(65) Prior Publication Data

US 2022/0114533 A1 Apr. 14, 2022

Related U.S. Application Data

(60) Provisional application No. 63/091,559, filed on Oct. 14, 2020.

(51) Int. Cl.
*G06Q 10/0631* (2023.01)
*G06N 10/00* (2022.01)
(Continued)

(52) U.S. Cl.
CPC ..... *G06Q 10/063116* (2013.01); *G06N 10/00* (2019.01); *G06Q 10/1097* (2013.01); *G06Q 50/40* (2024.01); *G06N 10/60* (2022.01)

(58) Field of Classification Search
CPC ........ G06N 10/60; G06N 20/00; G06N 3/084; B61L 15/0058; G06Q 10/04; G06Q 10/0631; G06F 17/11; G06F 9/3001
See application file for complete search history.

(56) References Cited

U.S. PATENT DOCUMENTS

| 2018/0276555 A1* | 9/2018 | Weichenberger | ...... G06N 10/60 |
| 2019/0322299 A1* | 10/2019 | Mong | ................. B61L 15/0072 |
| 2020/0175413 A1 | 6/2020 | Hsu et al. | |

FOREIGN PATENT DOCUMENTS

| CA | 3167477 A1 * | 8/2017 | ......... G01C 21/3407 |
| CN | 112288205 B * | 2/2024 | ....... G06Q 10/06311 |

(Continued)

OTHER PUBLICATIONS

Domino, Krzysztof, et al. "Quantum computing approach to railway dispatching and conflict management optimization on single-track railway lines." arXiv preprint arXiv:2010.08227 (2020) https://arxiv.org/abs/2010.08227 (Year: 2020).*

(Continued)

*Primary Examiner* — Jerry O'Connor
*Assistant Examiner* — Michael R Koester
(74) *Attorney, Agent, or Firm* — Mannava & Kang, P.C.

(57) ABSTRACT

Methods, systems, and apparatus for obtaining solutions to train and driver recovery problems using quantum computation. In one aspect, a method includes receiving data representing a train and driver recovery problem, wherein the train and driver recovery problem comprises a task of recovering from a disruption to a planned train and driver schedule; generating, based on the data representing the train and driver recovery problem, a quadratic unconstrained binary optimization (QUBO) formulation of the train and driver recovery problem, wherein the QUBO formulation excludes variables that relax constraints on driver duties; obtaining data representing a solution to the train and driver (Continued)

recovery problem from a quantum computing resource, wherein the data representing the solution to the train and driver recovery problem comprises an adjusted train and driver schedule; and initiating an action based on the obtained data representing a solution to the train and driver recovery problem.

17 Claims, 5 Drawing Sheets

(51) Int. Cl.
  *G06N 10/60* (2022.01)
  *G06Q 10/109* (2023.01)
  *G06Q 10/1093* (2023.01)
  *G06Q 50/40* (2024.01)

(56) References Cited

FOREIGN PATENT DOCUMENTS

EP         1764280 A1     3/2007
WO    WO-2016011440 A1 *  1/2016  ........... G06N 99/002

OTHER PUBLICATIONS

Yarkoni, Sheir, et al. "Quantum shuttle: traffic navigation with quantum computing." Proceedings of the 1st ACM SIGSOFT international workshop on architectures and paradigms for engineering quantum software. 2020 pp. 22-30 (Year: 2020).*
EP Extended Search Report in European Appln. No. 21201371.8, dated Mar. 14, 2022, 8 pages.
Kochenberger et al., "The unconstrained binary quadratic programming problem: a survey" J. Comb. Optimization, Jul. 2014, 28(1):58-81.
Quantum Technology and Optimization Problems, 1st ed., Feld et al. (eds.), Mar. 18, 2019, 234 pages.
APIList.fun [online], "Deutsche Bahn Timetables," upon information and belief, available no later than Jun. 24, 2020, retrieved on Mar. 8, 2022, retrieved from URL<https://apilist.fun/api/deutsche-bahn-timetables>, 4 pages (with English translation).
Cacchiani et al., "An Overview of Recovery Models and Algorithms for Real-time Railway Rescheduling," Transportation Research Part B: Methodological, May 2014, 63:15-37.
Caprara et al., "Solution of the Train Platforming Problem," Transportation Science, May 2011, 45(2):246-257.
D'Ariano et al., "Effects of flexible timetables in real-time scheduling of rail operations," Presented at Proceedings of the 6th Triennial Symposium on Transportation Analysis (TRISTAN), Phuket, Thailand, Jun. 10-15, 2007, 7 pages.
Destatis.de [online], "Themes," available on or before Jul. 30, 2019 via Internet Archive: Wayback Machine URL<https://www.destatis.de/EN/Themes/_node.html>, retrieved on Mar. 8, 2022, retrieved from URL<https://www.destatis.de/EN/Themes/_node.html>, 1 page.
DeutscheBahn.com [online], "Records," upon information and belief, available no later than Jun. 24, 2020, retrieved on Mar. 8, 2022, retrieved from URL<https://data.deutschebahn.com/dataset.groups.datasets.html>, 8 pages (with English translation).
Dkriesel.com [online], "Video and slides of my 36C3 lecture "BahnMining"," Dec. 29, 2019, retrieved on Mar. 8, 2022, retrieved from URL<https://www-dkriesel-com.translate.goog/blog/2019/1229_video_und_folien_meines_36c3-vortrags_bahnmining?_x_tr_sch=http&_x_tr_sl=auto&_x_tr_tl=en&_x_tr_hl=en-US>, 7 pages (with English translation).
Dorda et al., "Modelling of Freight Trains Classification Using Queueing System Subject to Breakdowns," Mathematical Problems in Engineering, Oct. 30, 2013, 2013:307652, 12 pages.
Dwavesys.com [online], "Allocating Railway Traffic with QUBO Formulated Models," Mar. 27, 2019, retrieved on Mar. 8, 2022, retrieved from URL<https://www.dwavesys.com/media/tridw5db/29_dwave-milano_fsi-data.pdf>, 20 pages.
Factorio.com [online], "Factorio," available on or before Dec. 6, 2013 via Internet Archive: Wayback Machine URL<https://web.archive.org/web/20131206095024/HTTPS://FACTORIO.COM/>, retrieved on Mar. 8, 2022, retrieved from URL<https://factorio.com/>, 4 pages.
Futureiot.tech [online], "Toshiba develops sensor-based structural monitoring system," Mar. 26, 2020, retrieved on Mar. 8, 2022, retrieved from URL<https://futureiot.tech/TOSHIBA-DEVELOPS-SENSOR-BASED-STRUCTURAL-MONITORING-SYSTEM/>, 9 pages.
GitHub.com [online], "DBOpenData," upon information and belief, available no later than Jun. 24, 2020, retrieved on Mar. 8, 2022, retrieved from URL<https://github.com/dbopendata>, 3 pages.
GitHub.com [online], "Query the Deutsche Bahn Timetable API," available on or before Jun. 17, 2018 via Internet Archive: Wayback Machine URL<https://web.archive.org/web/20180617170316/https://github.com/ottlngr/openbahn>, retrieved on Mar. 8, 2022, retrieved from URL<https://github.com/ottingr/openbahn>, 5 pages.
HelixPersonas.com [online], "Helix Personas: Predicting consumer behaviour," available on or before Sep. 21, 2013 via Internet Archive: Wayback Machine URL<https://web.archive.org/web/20130921201142/https://www.helixpersonas.com.au/>, retrieved on Mar. 8, 2022, retrieved from URL<https://www.helixpersonas.com.au/>, 17 pages.
Huisman et al., "A solvable queueing network model for railway networks and its validation and applications for the Netherlands," European Journal of Operational Research, Oct. 1, 2002, 142(1):30-51.
Mannino et al., "Optimal Real-Time Traffic Control in Metro Stations," Operations Research, Jul.-Aug. 2009, 57(4):1026-1039.
Rezanova et al., "The train driver recovery problem—A set partitioning based model and solution method," Computers & Operations Research, May 2010, 37(5):845-856.
Walker et al., "Simultaneous disruption recovery of a train timetable and crew roster in real time," Computers & Operations Research, Aug. 2005, 32(8):2077-2094.
Zeng et al., "Modeling, Planning, and Control of Complex Logistic Processes," Mathematical Problems in Engineering, Jul. 23, 2014, 2014:914706, 14 pages.
Office Action for EP Patent Application No. EP 21201371.8, dated May 27, 2025, 6 pages.

* cited by examiner

QUANTUM COMPUTATION FOR TRAIN AND DRIVER RECOVERY PROBLEMS

CROSS-REFERENCE TO RELATED APPLICATION

This application claims the benefit of U.S. Provisional Application No. 63/091,559, filed Oct. 14, 2020, and titled "Quantum Computation for Train and Driver Recovery Problems," which is incorporated by reference.

TECHNICAL FIELD

The present invention relates to quantum computing.

BACKGROUND

Public rail transport companies providing transport services across a network are faced with multiple resource re-allocation challenges in the event of an unplanned disruption, including determining a reassignment of train driver tasks that satisfy legal and regulatory working conditions and determining an updated schedule of trains' tasks that provide a capacity as planned in the original schedule.

The large amount of constraints under which a rescheduling must be determined, including constraints on driver breaks and variables describing train crossings, increase the complexity of the task of determining such reassignments and updated schedules. Therefore, approximations are often introduced. For example, the task can be approximately solved by initially excluding a subset of the constraints and iteratively introducing additional variables, e.g., using a branch-and-bound algorithm.

A branch-and-bound algorithm includes systematically enumerating candidate solutions by means of a state space search, in which the set of candidate solutions form a rooted tree with the full set at the root. The algorithm explores branches of this tree, which represent subsets of the solution set. Before enumerating the candidate solutions of a branch, the branch is checked against upper- and lower-estimated bounds on the optimal solution, and is discarded if it cannot produce a better solution than the best one found so far by the algorithm.

SUMMARY

This specification describes methods and systems for solving train and driver recovery problems using quantum computation.

In general, one innovative aspect of the subject matter described in this specification can be implemented in a method that includes: receiving data representing a train and driver recovery problem, wherein the train and driver recovery problem comprises a task of recovering from a disruption to a planned train and driver schedule; generating, based on the data representing the train and driver recovery problem, a quadratic unconstrained binary optimization (QUBO) formulation of the train and driver recovery problem, wherein the QUBO formulation excludes variables that relax constraints on driver duties; obtaining data representing a solution to the train and driver recovery problem from a quantum computing resource, wherein the data representing the solution to the train and driver recovery problem comprises an adjusted train and driver schedule; and initiating an action based on the obtained data representing a solution to the train and driver recovery problem.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the data representing the train and driver recovery problem can include input data specifying the problem, the input data including: i) data representing a set of available train drivers, ii) data representing a set of candidate train and driver tasks, iii) data representing a set of available trains, iv) data representing scheduled start times of respective train and driver tasks, and v) data representing durations of scheduled stops for respective trains after completion of respective train tasks.

The data representing the solution to the train and driver recovery problem can include i) data representing a set of feasible recovery duties for each available driver and ii) data representing a set of feasible routes and start times for each available train.

Initiating an action based on the obtained data representing a solution to the train and driver recovery problem can include one or more of: i) transmitting the adjusted train and driver schedule to a railway control system for real time implementation of the adjusted train and driver schedule, and ii) operating available trains and available train drivers according to the adjusted train and driver schedule.

The QUBO formulation of the train and driver recovery problem can include one or more penalty terms, the one or more penalty terms can include a first penalty term that penalizes solutions to the train and driver recovery problem that assign each train driver more than one recovery duty. The first penalty term can include a first penalty factor multiplied by a square of i) one minus ii) a sum, over a set of feasible recovery duties for each available driver, of binary decision variables for duty p assigned to driver k, wherein the first penalty factor is larger than an upper bound of a corresponding QUBO objective function. The QUBO formulation of the train and driver recovery problem can include one or more penalty terms, the one or more penalty terms can include a second penalty term that penalizes solutions to the train and driver recovery problem that assign train tasks without a driver.

The QUBO formulation of the train and driver recovery problem can include one or more penalty terms, the one or more penalty terms can include a third penalty term that penalizes solutions to the train and driver recovery problem that allow, for a same train and particular task, a start time for a next task to be earlier than i) an end time for the particular task plus ii) a predetermined stop duration. The third penalty term can include a third penalty factor multiplied by a square of i) the start time for the next task, minus ii) a slack variable, minus iii) the end time for the particular task, minus iv) the predetermined stop duration.

The QUBO formulation of the train and driver recovery problem can include one or more penalty terms, the one or more penalty terms can include a fourth penalty term that penalizes solutions to the train and driver recovery problem that include one or more train tasks with start times that are not later than a previously scheduled start time of a previous task plus a duration of the previous task and a predefined idling duration. The fourth penalty term can include a fourth penalty factor multiplied by a square of i) the start time for the next task, minus ii) a start time for a current task, minus iii) a slack variable, minus iv) a duration of the current task, minus iv) a predetermined stop duration.

The QUBO formulation of the train and driver recovery problem can include one or more penalty terms, the one or more penalty terms comprising a fifth penalty term that penalizes solutions to the train and driver recovery problem.

The QUBO formulation of the train and driver recovery problem can include one or more penalty terms, the one or more penalty terms can include a sixth penalty term that penalize solutions to the train and driver recovery problem that that include, for a task that requires a locomotive exchange between trains during the task, a start time for a second train that is not later than i) a scheduled start time of the task with a first train plus ii) a duration of the task with the first train plus iii) a predefined idling duration plus iv) a time taken to exchange locomotives. The sixth penalty term can include a sixth penalty factor multiplied by a square of i) a start time for a second train, minus ii) a start time for the first train, minus iii) a slack variable, minus iv) a duration of the task with the first train, minus v) the predefined idling duration, minus vi) the time taken to exchange locomotives.

The method can further include: determining a number of available qubit resources; and in response to determining that a first number of qubits are available: processing, by quantum computation, the QUBO formulation of the train and driver recovery problem to obtain a first solution to the train and driver recovery problem, and performing, by classical computation and based on the obtained first solution, a branch and bound method to obtain a solution to the train and driver recovery problem that incorporates train crossing constraints.

The method can further include: determining a number of available qubit resources; and in response to determining that a second number of qubit are available: processing, by quantum computation, the QUBO formulation of the train and driver recovery problem to obtain a first solution to the train and driver recovery problem, and performing, by quantum computation and based on the obtained first solution, a branch and bound method to obtain a solution to the train and driver recovery problem that incorporates train crossing constraints.

The method can further include: determining a number of available qubit resources; and in response to determining that a third number of qubits are available, generating adjusted QUBO formulation of the train and driver recovery problem, comprising incorporating train crossing constraints in the QUBO formulation of the train and driver recovery problem, and processing, by quantum computation, the adjusted QUBO formulation of the train and driver recovery problem to obtain a solution to the train and driver recovery problem.

The subject matter described in this specification can be implemented in particular ways so as to realize one or more of the following advantages.

Systems that utilize quantum computing resources, as described in this specification, can more quickly obtain solutions to optimization problems (such as the train and driver recovery problem) compared to systems that use only classical computing resources. For example, by formulating a train and driver recovery problem as a QUBO problem using the techniques described in this specification, the problem can be provided to a quantum computing resource that has the processing capabilities to efficiently solve the problem. In addition, larger sized, complex and interconnected transportation networks can be considered.

Because of this increase in efficiency, train and driver recovery problems can be updated and solved in real time. This can be particularly advantageous in the transportation industry, where disruptions and the conditions under which a transportation route is to be completed can often change or be updated. In addition, because of this increase in efficiency, highly complex problems can be solved exactly without the use of heuristics that typically reduce the complexity of the problem and therefore produce solutions with lower accuracy. Therefore, optimal timetable schedules can be dynamically determined and the day to day network reliability and punctuality can be improved. Further, by promoting accessibility and prioritizing high demand/high usage areas, operation of the network can be improved.

In addition, the presently described techniques support the inclusion of additional problem constraints such as cost of delay penalties, and therefore can provide more accurate, optimal solutions.

In addition, the presently described techniques can adaptively cope with model complexities in the coming eras of small-scale to large-scale integrated quantum hardware though efficient trade-offs between classical and quantum resource limitations.

In addition, the presently described techniques can be applied to a variety of different type of problems. For convenience and clarity, the present description uses the train and driver recovery problem as a primary application of the described techniques. However the techniques could also be applied to other public transport network settings, e.g., freight transport, airlines, bus and tram network, as well as problems with a similar structure as the train and driver recovery problem. In some cases the techniques can also provide a seamless and connected service with other modes of transport at multi-modal transport junctions for, e.g., airports, center city train stations, or ferry terminals.

In addition, the presently described techniques can be used to develop recovery action plans that can be implemented in preparation of unusual circumstances, e.g., preparing for extreme weather events or large scale network upgrades.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for obtaining solutions to train and driver recovery problems using quantum computation.

The train and driver recovery problem is the task of recovering from a disruption to a planned train and driver schedule, e.g., determining a recovery operation that includes an updated train and driver schedule which, when implemented, will enable the corresponding rail network to return to planned operation as soon as possible and with minimal costs.

Figure 1:
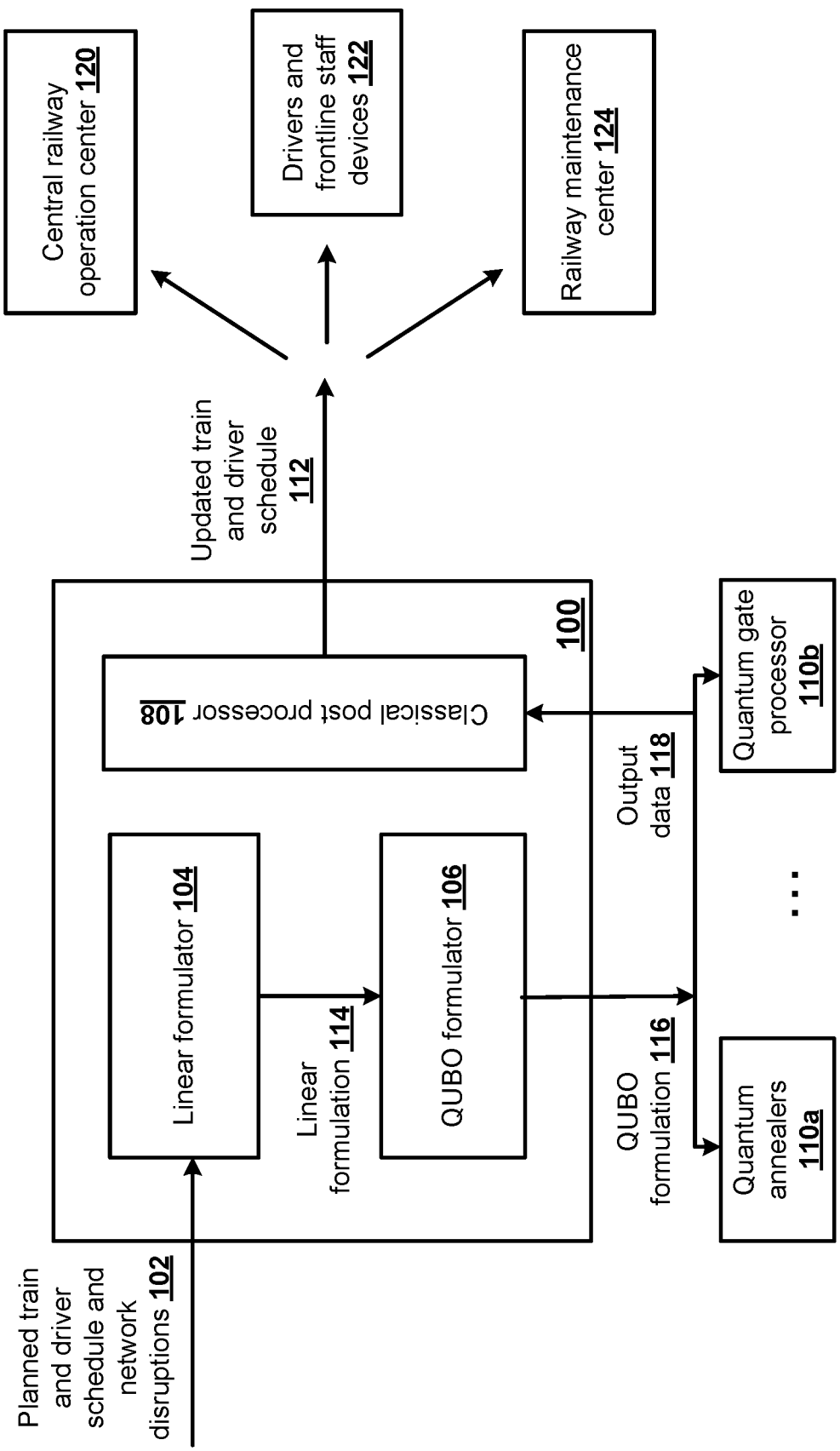
FIG. 1 shows an example system for obtaining a solution to a train and driver recovery problem.

FIG. 1 depicts an example system 100 for obtaining a solution to a train and driver recovery problem. The system 100 is an example of a system implemented as computer programs on one or more classical or quantum computing devices in one or more locations, in which the systems, components, and techniques described below can be implemented.

The system 100 includes a linear formulator 104, a QUBO formulator 106, a classical post-processor 108, and one or more quantum computing resources, e.g., quantum annealer 110a and quantum gate processor 110b. For convenience, two additional quantum computing resources are shown in FIG. 1, with the quantum computing resources being external to the system 100. However in some implementations the system 100 can be in communication with more or fewer additional quantum computing resources, or the system 100 can include the quantum computing resources. Components of the system 100 can be in data communication with each of the additional quantum computing resources, e.g., through a communication network such as a local area network or wide area network.

The system 100 is configured to receive as input data representing a train and driver recovery problem, e.g., input data 102. As described in more detail below with reference to step 202 of FIG. 2, the input data 102 can include data specifying the train and driver recovery problem to be solved. For example, the input data 102 can include data representing a planned train and driver schedule and data representing current causes of disruption, e.g., line closures or blockages, train breakdowns, driver illnesses or other unforeseen circumstances that can disrupt the planned schedule.

The system 100 processes the received input data 102 to generate as output data representing actions to be initiated. The actions are based on a determined solution to the train and driver recovery problem. For example, the actions can include transmitting an updated train and driver schedule 112 to a central railway operation center 120, driver and frontline staff devices 122 or a railway maintenance center 124 for the railway network so that the railway network can implement the updated schedule.

The system 100 is configured to determine a solution to the train and driver recovery problem represented by the input data 102. To determine a solution to the train and driver recovery problem, the system 100 uses one or more of the linear formulator 104, the QUBO formulator 106 or the classical post processor 108.

The linear formulator 104 is configured to receive the input data 102 and to process the received input data to determine a linear formulation 114 of the train and driver recovery problem represented by the input data 102. Example operations performed by the linear formulator 104 when processing received input data are described below with reference to FIG. 2.

The linear formulator 104 is configured to provide the determined linear formulation 114 of the train and driver recovery problem represented by the input data 102 to the QUBO formulator 106. The QUBO formulator 106 is configured to generate a QUBO formulation of the train and driver recovery problem represented by the input data 102, e.g., by mapping the linear formulation 114 to a corresponding QUBO formulation 116. Example operations performed by the QUBO formulator 106 when generating a QUBO formulation for received input data are described below with reference to FIG. 2.

The system 100 is configured to transmit data representing the QUBO formulation 116 of the train and driver recovery problem represented by the input data 102 to one or more quantum computing resources. For example, the QUBO formulator 106 can directly provide the QUBO formulation 116 of the train and driver recovery problem to be solved to one or more quantum computing resources.

The quantum computing resources can include quantum annealer computing resources, e.g., quantum annealer 110a. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcomes localized barriers in the energy landscape which cannot be overcome by a classically described system. Some quantum annealer devices perform a subclass of quantum annealing called adiabatic quantum computing, which relies on the adiabatic theorem to perform computations.

Quantum annealer devices can solve problems if they are formulated in an acceptable format. For example, quantum annealer devices can solve some QUBO formulations of problems by mapping the QUBO formulation into a qubit network of a quantum annealer device.

The quantum computing resources can include one or more quantum gate processors, e.g., quantum gate processor 110b. A quantum gate processor includes one or more quantum circuits, i.e., models for quantum computation in which a computation is performed using a sequence of quantum logic gates, operating on a number of qubits (quantum bits).

Quantum gate processors can be used to solve certain optimization problems, e.g., problems that can be formulated as a QUBO problem. For example, some quantum gate processors can solve QUBO problems by simulating a corresponding adiabatic quantum annealing process using a gate model. This can be advantageous, e.g., compared to directly performing the corresponding adiabatic quantum annealing process using a quantum annealer device, since not all quantum annealer devices can realize physical quantum systems that represent an optimization problem. For example, some quantum annealer devices may not provide the physical interactions necessary to solve an optimization problem. In these examples, a Hamiltonian describing the optimization problem can be decomposed into a sequence of single or multi-qubit quantum gates, and a solution to the optimization problem can be obtained through application of the sequence of single or multi-qubit gates on a register of qubits and subsequent measurement of the register of qubits.

The one or more quantum computing resources that receive the transmitted data representing the QUBO formulation 116 of the train and driver recovery problem represented by the input data 102 are configured to process the received data to generate output data 118 representing a solution to the train and driver recovery problem. The one or more quantum computing resources are configured to provide the generated output data 118 to the system 100, e.g., to the classical post processor 108.

The system 100 is configured to receive the output data 118 from the one or more quantum computing resources. The classical post-processor 108 is configured to process the received output data 118. Processing the output data 118 can include determining one or more actions to be taken based on the solution to the train and driver recovery problem. The system 100 is configured to output data representing determined actions that can be taken 112. For example, the system 100 can provide the data 112 to, or include, a broker that initiates actions based on the output data.

Figure 2:
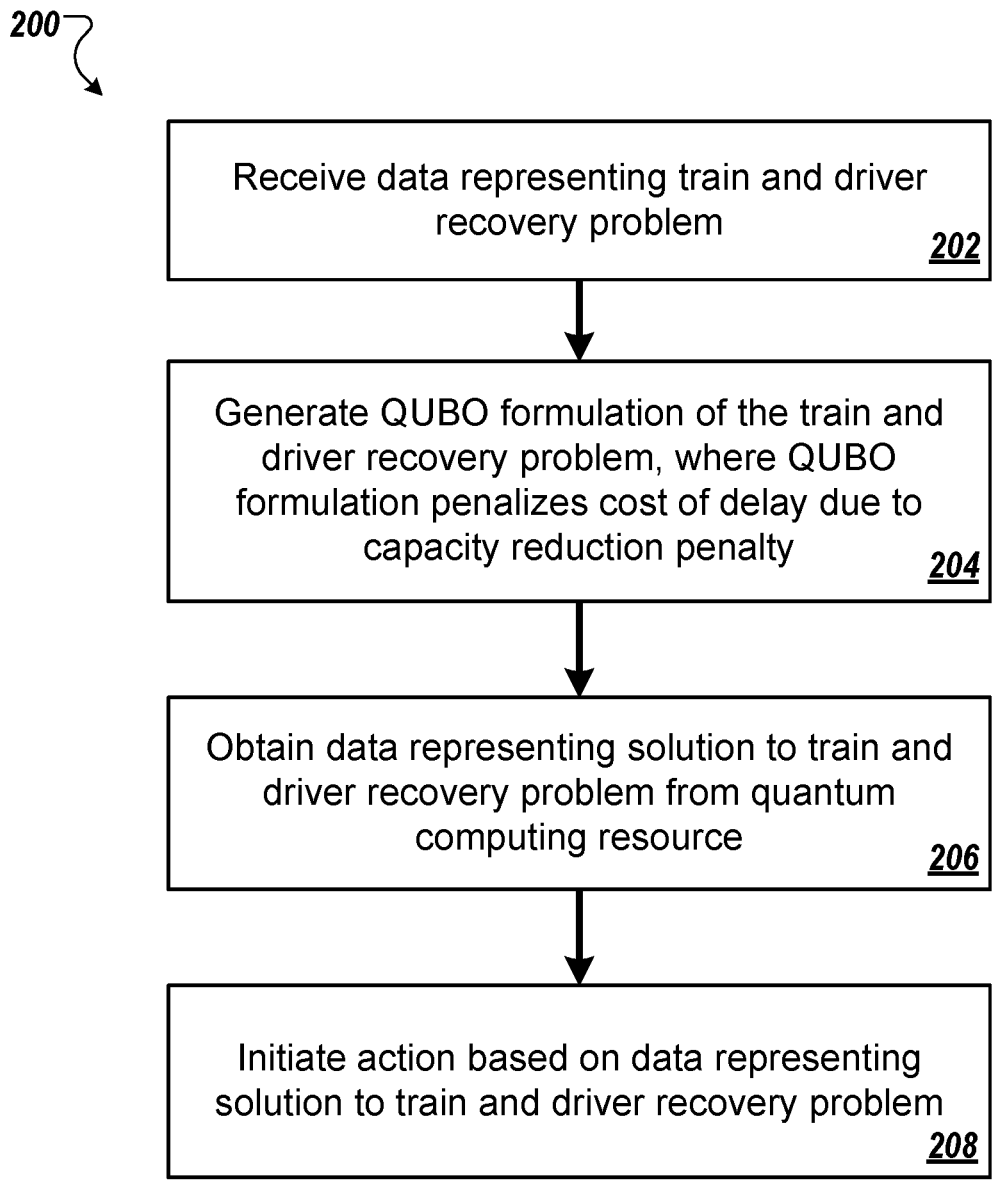
FIG. 2 is a flow diagram of an example process for obtaining a solution to a train and driver recovery problem using quantum computing resources.

FIG. 2 is a flowchart of an example process 200 for obtaining a solution to a train and driver recovery problem using quantum computing resources. For convenience, the process 200 will be described as being performed by a system of one or more classical or quantum computing devices located in one or more locations. For example, example system 100 of FIG. 1, appropriately programmed in accordance with this specification, can perform the process 200.

The system receives data representing a train and driver recovery problem (step 202). The data representing the train and driver recovery problem includes input data specifying the problem, e.g., a planned train and driver schedule and causes of the current disruption such as line closures or train breakdowns. For example, the received data can include i) data representing a set of available train drivers, ii) data representing a set of candidate train and driver tasks, iii) data representing a set of available trains, iv) data representing scheduled start times of respective train and driver tasks, v) data representing durations of scheduled stops for respective trains after completion of respective train tasks, vi) data representing the rail network, and vii) data representing a current or predicted status of the network (including any line closures).

In some implementations example process 200 can be used to develop an emergency action plan in preparation of unusual circumstances, e.g., an extreme weather event or large scale network upgrade. In these implementations an operator of the network can identify areas of the network that might be affected by the unusual circumstances, e.g., lines or stations that are being upgraded and will therefore be closed, or lines that are likely to flooded or otherwise blocked in the case of a severe storm. The operator can then input the above described data i)-vii) to the system, e.g., through a graphical user interface.

In some implementations the received data can also include data representing penalties to incorporate into the solution to the train and driver recovery problem.

For example, the data can include data representing one or more operational penalties. Such penalties can be based on network operator requirements. For example, some operators can be penalized by the government or network owner if the network does not meet key performance indicators or service level agreements related to punctuality, reliability or customer satisfaction targets, e.g., a target stating that train delivery should be at least 98% of the timetable or a target stating that 90% of trains arriving at each stop should not be more than 5 minutes late. Such data can be directly received as input or can be accessed by the system, e.g., using a lookup table associated with the particular network.

As another example, the data can include data representing one or more customer compensation penalties. For example, some operators can be penalized if the network does not meet performance targets, e.g., customers can be eligible for financial compensation if they incur delays that exceed a predetermined threshold. Such data can be directly received as input or can be accessed by the system, e.g., using a lookup table associated with the particular network.

As another example, the data can include data representing revenue loss penalties, e.g., if a disruption results in a 20% reduced capacity then the system can calculate an estimated associated loss in revenue using historic customer ticket revenue data over a similar time period and penalize solutions to the problem that exceed a predefined accepted loss in revenue. Such data can be directly received as input or can be accessed by the system, e.g., using a lookup table associated with the particular network.

In some implementations the received data representing the train and driver recovery problem can include data specifying an objective function to be minimized and/or one or more constraints (which can ensure that the recovery schedule is feasible and valid). In other implementations the system can determine an objective function to be minimized and/or one or more constraints based on the received input data.

For example, in some implementations the system can determine an objective function to be minimized (over $t_n^q$ and $x_p^k$) as given below in Equation (1).

$$\sum_{q \in Q} \sum_{n \in N} c_n^q (t_n^q - t_n'^q) + \sum_{k \in K} \sum_{p \in P^k} c_p^k x_p^k \qquad (1)$$

In Equation (1):
- K represents a set of available train drivers, e.g., train drivers involved in the recovery operation and k represents a train driver index,
- N represents a set of candidate train and driver tasks and n represents a train and driver task index, where a train and driver task is defined as the task of driving a train between two terminal stations,
- Q represents a set of available trains and q represents a train index,
- $P^k$ represents a set of feasible recovery duties for driver $k \in K$, where a driver duty is defined as a sequence of tasks, e.g., train drives, meal breaks, passenger breaks, and p represents a feasible recovery duty index that can contain a possibly empty subset of train tasks $n \in N$,
- $c_n^q$ represents an associated cost of task n with train q. In some implementations these costs can be pre-set by the rail network and provided as input step 202 or accessed by the system, e.g., using a lookup table associated with the rail network. Alternatively or in addition, the costs can be based on the above described penalties. For example, the rail network can provide the pre-set costs as input and the system can adjust the costs based on data representing one or more of the above described penalties,
- $t_n^q \in \mathbb{R}^+$ is an optimization variable that represents a start time of task $n \in N$ for all tasks starting after disruption at time $t_{n_d}^{qd}$, where $t_{n_d}^{qd} = t'_{n_d}^{qd} + \tau_{n_d,delay}^{qd}$ represents a new departure time to scheduled ones by exogenous delays with $t'_{n_d}^{qd}$ representing a scheduled start time of train $q_d$ when finishing task $n_d$ and $\tau_{n_d,delay}^{q_d}$ representing a delay (duration of time) of train $q_d$ when finishing task $n_d$, $t'^q_n$ represents a scheduled start time of train task $n \in N$ with train $q \in Q$ (therefore, $t_n^q - t'^q_n$ represents a deviation from the scheduled start time of task n with train q, i.e., the difference between the planned time t' and the time the train starts according to the new recovery schedule and $c_n^q$ is an associated penalty cost for task n representing a cost of the deviation\delay), $c_p^k$ represents an associated cost of duty $p \in P$ for driver $k \in K$. As described above, in some implementations these costs can be pre-set by the rail network and provided as input step 202 or accessed by the system, e.g., using a lookup table associated with the rail network. Alternatively or in addition, the costs can be based on the above described penalties. For example, the rail network can provide the pre-set costs as input and the system can adjust the costs based on data representing one or more of the above described penalties, and $x_p^k \in \{0, 1\}$ is an optimization variable for a duty $p \in P^k$ assigned to driver $k \in K$.

As another example, in some implementations the system can determine an objective function to be minimized as given below in Equation (2).

$$\sum_{k \in K} \sum_{p \in P_k} C_{k,p}^{(1)} x_k^p + \sum_{n \in N} \sum_{k \in K} \sum_{\substack{p \in P_k \\ n \in p}} x_k^p C_{n,k,p}^{(2)} T_{n,k,p}^{(D)} \quad (2)$$

In Equation (2):

K represents the set of available train drivers in the recovery period.

N represents the set of tasks that is to be operated by drivers in K in the recovery period.

$P_k$ represents the set of feasible recovery duties for driver $k \in K$, in which a recovery duty $p \in P_k$ is a unique subset of tasks in N that can be operated by driver k. That is, $P_k = \{p \subset N$: all tasks in p can be operated by driver k$\}$ It is noted that the empty set is always in $P_k$, which corresponds to no task assigned to driver k.

$C_{k,p}^{(1)}$ represents the associated cost of assigning driver $k \in K$ to duty $p \in P_k$.

The scheduling requires a definition of time that is discretized. It can be assumed that the time takes a value in the set of equally spaced and ordered times $T = \{0, 1, \ldots, T_{max}\}$ for some $T_{max} \in \mathbb{N}$.

$T_n \in T$ is the scheduled departure time of task $n \in N$.

$\tilde{T}_{n,k,p} \in T$ represents the earliest departure time of task $n \in N$ operated by driver $k \in K$ that is being assigned duty $p \in P_k$ in which $n \in p$.

Let $T_{n,k,p}^{(D)} \in T$ represent the delay of task $n \in N$, conditioned on the task being operated by driver $k \in K$ that is being assigned duty $p \in P_k$, in which $n \in p$. Then $$T_{n,k,p}^{(D)} = \max\{0, \tilde{T}_{n,k,p} - T_n\}$$

$C_{n,k,p}^{(2)}$ represents the cost of task $n \in N$ operated by driver $k \in K$ that is being assigned duty $p \in P_k$ in which $n \in p$.

Hence if driver k is selected to operate task n with the duty $p \in P_k$ (which includes task n), the cost associated to the delay is $$C_{n,k,p}^{(2)} T_{n,k,p}^{(D)}$$

$x_k^p \in \{0,1\}$ is a binary variable, where $k \in K$ and $p \in P_k$, in which $$x_k^p = \begin{cases} 1 & \text{if duty } p \text{ is assigned to driver } k \\ 0 & \text{otherwise} \end{cases}$$

The first term of Equation (2) represents a total cost of the recovery scheduling and the second term represents the total cost from delays. This objective function can also be written as $$\sum_{k \in K} \sum_{p \in P_k} x_k^p \left( C_{k,p}^{(1)} + \sum_{\substack{n \in N \\ n \in p}} C_{n,k,p}^{(2)} T_{n,k,p}^{(D)} \right) \quad (3)$$

Unlike conventional treatments of the train and driver recovery problem, the objective functions given by Equations (1-3) do not include variables that relax constraints on driver duties.

The one or more constraints can include task assignment constraints. For example, a first constraint can penalize recovery operations that assign each train driver to multiple recovery duties in the updated schedule. That is, the constraint can restrict any driver to one feasible duty. In the above described notation for Equation (1), the first constraint can be given by $\Sigma_{p \in P^k} x_p^k = 1$ for all $k \in K$. In the above described notation for Equations (2) and (3), the first constraint can be given by $\Sigma_{p \in P_k} x_k^p = 1$, $\forall k \in K$.

As another example, a second constraint can penalize recovery operations that do not assign train tasks to a driver. That is, the second constraint can ensure that each task is assigned to one and only one driver. In the above described notation for Equation (1), the second constraint can be given by $\Sigma_{k \in K} \Sigma_{p \in P^k} \alpha_{np}^k x_p^k = 1$ for all $n \in N$ where $\alpha_{np}^k \in 0, 1$ represents a derived parameter that tracks whether task $n \in N$ is covered by duty p of driver k. In the above described notation for Equations (2) and (3) the second constraint can be given by $$\sum_{k \in K} \sum_{\substack{p \in P_k \\ n \in p}} x_k^p = 1, \forall n \in N.$$

The one or more constraints can also include timing constraints. For example, a third constraint can penalize recovery operations that include one or more train tasks with start times $t_n^q$ that are not later than completion times of disrupted previous tasks $t_{n,disrupt}^q$ plus a predefined idling/stop duration $\tau_{n,stop}^q$. That is, for a fixed train, a start time of a next task should not be earlier than or too close to a disrupted completion time of the previous task. In the above described notation, the third constraint can be given by $t_n^q \geq t_{n,disrupt}^q + \tau_{n,stop}^q$.

As another example, a fourth constraint can penalize recovery operations that include one or more train tasks with start times $t_n^q$ that are not later than a previously scheduled start time $t_n^q$ of a previous task plus the duration of the previous task $\tau_n^q$ and a predefined idling duration $\tau_{n,stop}^q$. That is, for a fixed train, a start time of a next task should not be earlier than or too close to the start time of the previous task plus the duration of the previous task. In the above described notation, the fourth constraint can be given by $t_n^q - t_n^q \geq \tau_n^q + \tau_{n,stop}^q$.

As another example, a fifth constraint can be given by $t_{min}^q + s_{t_{min}}^q = t_n^q = t_{max}^q + s_{t_{max}}^q$, where $s_{t_{min}}^q$ is a slack variable representing how much additional time is needed for completing the train task q assuming a minimum duration for the task q of $t_{min}$ for completion.

As another example, a sixth constraint can penalize recovery operations that include, for a task n that requires a locomotive exchange between trains at some point n' during the task, a start time $t_n^q$ that is not later than a previously scheduled start time of the task $t_n^{q'}$ with a previous train q' plus the duration of the previous task $\tau_n^{q'}$ and a predefined idling duration $\tau_{n,stop}^{q'}$ and a time taken $\tau_{xloc}^{qq'}$ to exchange the locomotives q, q'. In the above described notation, the sixth constraint can be given by $t_n^q - t_n^{q'} \geq \tau_n^{q'} + \tau_{n,stop}^{q'} + \tau_{xloc}^{qq'}$.

In some implementations the one or more constraints can also include train crossing constraints. In some implementations the model can be extended to include freight- and military trains running on identical tracks by extending the number of trains and train tasks as well as including an additional partitioning constraint for military/freight train drivers and tasks. The cost factor for time delays can then be interpreted as prioritization factor and set to lower values in case certain trains have lower priority. In some implementations the system can also include a penalty that factors in the capacity of the train to ensure capacity recovery, e.g., by multiplying the number of passengers to be transported on task n by the delay cost per person.

In some implementations the one or more constraints can be weighted based on the above described penalties.

The system uses the data representing the train and driver recovery problem to generate or obtain a QUBO formulation of the train and driver recovery problem (step 204). Generating the QUBO formulation includes mapping the data representing the train and driver recovery problem, e.g., the linear objective function given by any of Equations (1), (2), (3) above and the above described constraints, to a non-linear QUBO formulation.

The QUBO formulation of the train and driver recovery problem includes a QUBO objective function. In the notation of Equation (1), the QUBO objective function can be given by:

$$O(x_p^k, x_r^q, t_n^q) = \sum_{q \in Q} \sum_{n \in N} \sum_{i=0}^{\lfloor \log_2(t_n^q) \rfloor} c_n^q (t_{i,n}^q - t_{i,n}^{'q})^2 * 2^i + \sum_{k \in K} \sum_{p \in P^k} c_p^k (x_p^k)^2$$

where $t_{i,n}^q$ is the i-th bit of the binary representation of $t_n^q$, $t_{i,n}^{'q}$ represents the i-th bit of the binary representation of the disrupted start time $t_n^{'q}$ of task n with train q.

The QUBO formulation of the train and driver recovery problem further includes one or more penalty terms that are based on the above described task assignment constraints and timing constraints. For example, the one or more penalty terms can include a first penalty term that corresponds to the above describe first constraint. The first penalty term penalizes solutions to the train and driver recovery problem that assign each train driver more than one recovery duty. The first penalty term includes a first penalty factor $M_p$ multiplied by a square of i) one minus ii) a sum, over a set of feasible recovery duties for each available driver, of binary decision variables for duty p assigned to driver k, wherein the first penalty factor is larger than the upper bound of the QUBO objective function. That is, the first penalty term can be given by $$H_{M_p} = M_p \left(1 - \sum_{p \in P^k} x_p^k\right)^2$$

The one or more penalty terms can also include a second penalty term that corresponds to the above described second constraint. The second penalty term penalizes solutions to the train and driver recovery problem that assign train tasks without a driver. The second penalty term can be given by $$H_{M_{NP}} = M_{NP} \sum_{n \in N} \left(1 - \sum_{k \in K} \sum_{p \in P^k} \alpha_{np}^k x_p^k\right)^2$$

where $M_{NP}$ represents a second penalty factor that is larger than the upper bound of the QUBO objective function.

The one or more penalty terms can also include a third penalty term that corresponds to the above described third constraint. The third penalty term penalizes solutions to the train and driver recovery problem that allow, for a same train and particular task: a start time for a next task to be earlier than a time corresponding to i) the end time for the particular task plus ii) a predetermined stop duration. The third penalty term includes a third penalty factor $M_{ndisrupt}$ multiplied by a square of i) the start time for the next task, minus ii) a slack variable, minus iii) the end time for the particular task, minus iv) the predetermined stop duration. That is, the third penalty term can be given by $$H_{M_{ndisrupt}} = M_{ndisrupt} (t_n^q, -s_{ndisrupt} - t_{ndisrupt}^q - \tau_{n,stop}^q)^2$$

where $s_{ndisrupt} \in \mathbb{R}^+$ represents a slack variable.

The one or more penalty terms can also include a fourth penalty term that corresponds to the above described fourth constraint. The fourth penalty term can be given by $$H_{M_{snn}} = M_{snn} (t_n^q, -t_n^q - s_{nn+1} - \tau_n^q - \tau_{n,stop}^q)^2$$

where $s_{nn+1} \in \mathbb{R}^+$ represents a slack variable.

The one or more penalty terms can also include a fifth penalty terms that correspond to the above described fifth constraint. The fifth penalty terms can be given by $$H_{M_{t_{min}}} = M_{t_{min}} (t_{min}^q + s_{t_{min}}^q - t_n^q)^2$$

$$H_{M_{t_{max}}} = M_{t_{max}} (t_{max}^q + s_{t_{max}}^q - t_n^q)^2$$

where $s_{t_{min}}^q, s_{t_{max}}^q \in \mathbb{R}^+$ represent slack variables.

The one or more penalty terms can also include a sixth penalty term that corresponds to the above described sixth constraint. The sixth penalty term can be given by $$H(M_{xloc}) = M_{xloc}\left(t_n^q - t_{n'}^{q'} - s_{xloc} - \tau_n^{q'} - \tau_{n,stop}^{q'} - \tau_{xloc}^{qq'}\right)^2.$$

where $s_{xloc} \in \mathbb{R}^+$ represents a slack variable.

The QUBO formulation (including the QUBO objective function and constraints) in the notation of Equation (1) can therefore be given by $$O(x_p^k, x_r^q, t_n^q) + H(M_P) + H(M_{NP}) +$$
$$H(M_{ndisrupt}) + H(M_{snn}) + H_{M_{t_{min}}} + H_{M_{t_{max}}} + H(M_{xloc}).$$

In implementations where train crossing constraints are included in the model, e.g., in cases where a branch and bound method is applied or in a full quantum solution (as described below with reference to FIG. 3), the penalty terms can also include:

$$t_{n'}^{q'} - t_n^q - \gamma_{t't}^{q'q} M_x \geq \tau_n^q - M_x + \tau_x$$
$$t_n^q - t_{n'}^{q'} + \gamma_{t't}^{q'q} M_x \geq \tau_{n'}^{q'} + \tau_x$$

where $\gamma_{t't}^{q'q}$ represent binary variables with a value 1 if train q waits for train q' and otherwise takes value 0, $\tau_x$ represents a crossing delay, and $M_x$ is a constant with sufficiently large value such that the first constraint is satisfied when $\gamma_{t't}^{q'q}$ is equal to 0 and the second constraint is always satisfied.

In the notation of Equations (2) and (3), the QUBO objective function can be given by $$\min_{x_k^p \in \{0,1\}} \sum_{k \in K} \sum_{p \in P_k} x_k^p \left( C_{k,p}^{(1)} + \sum_{\substack{n \in N \\ n \in p}} C_{n,k,p}^{(2)} T_{n,k,p}^{(D)} \right) +$$
$$P_1 \sum_{k \in K} \left( \sum_{p \in P_k} x_k^p - 1 \right)^2 + P_2 \sum_{n \in N} \left( \sum_{k \in K} \sum_{\substack{p \in P_k \\ n \in p}} x_k^p - 1 \right)^2$$

where $P_1, P_2 >> 0$ represent penalty constants for the penalty terms corresponding to the first and second constraints.

The system obtains data representing a solution to the train and driver recovery problem from a quantum computing resource (step 206). The data representing the solution to the train and driver recovery problem includes an adjusted train and driver schedule which, when implemented, enables the network to return to planned operation as soon as possible and with minimal costs. For example, the input data received at step 202 can include data representing a set $P^k$ of recovery duties for each available train and driver, as provided by the train company. The system then generates data representing a set $R^q$ of routes $r(t_n^q)$ for each train $q \in Q$ with start times $t_n^q$ that cover all the required tasks (as set by the train company) and the quantum solution selects the most cost efficient recovery schedule from all these possible routes for all available trains and drivers.

In some implementations, to obtain the data representing a solution to the train and driver recovery problem, the system can transmit data specifying the QUBO formulation of the train and driver recovery problem to an external quantum computing resource for processing. The system can then receive data representing a solution to the train and driver recovery problem from the external quantum computing resource. In other implementations the system can include a quantum computing resource and locally process data specifying the QUBO formulation of the train and driver recovery problem to obtain data representing a solution to the train and driver recovery problem.

In some implementations, processing of the QUBO formulation of the train and driver recovery problem to obtain data representing a solution to the train and driver problem from a quantum computing resource can vary based on the type of quantum computing resources available, e.g., the number of available qubit resources included in an available quantum computing resource. Example techniques for processing a QUBO formulation of a train and driver recovery problem to obtain a solution to the train and driver recovery problem using different types of quantum computing resources are described in detail below with reference to FIG. 3.

The system initiates an action based on the obtained data representing a solution to the train and driver recovery problem (step 208). In some implementations the system can transmit the adjusted train and driver schedule to a railway control system for real time implementation of the adjusted train and driver schedule. For example, the system can transmit data representing the adjusted train and driver schedule to one or more of: a centralized operation center for testing or execution, regional operation centers and depot team leaders to communicate the adjusted train and driver schedule to drivers and other front line staff, customer service front line and other authorizes staff to communicate the adjusted train and driver schedule to passengers and to enable the staff to answer queries received from passengers, maintenance staff to adjust a routine maintenance schedule if the current maintenance schedule is affected by the adjusted train and driver schedule, a marketing or public affairs team to develop a messaging service and provide updates to the media, news channels, other transport mode operators and the public via various communication channels, an IT team to configure push notifications through mobile apps and other platforms, and a network strategy team to plan for future network improvements and capacity and mitigation planning.

Figure 3:
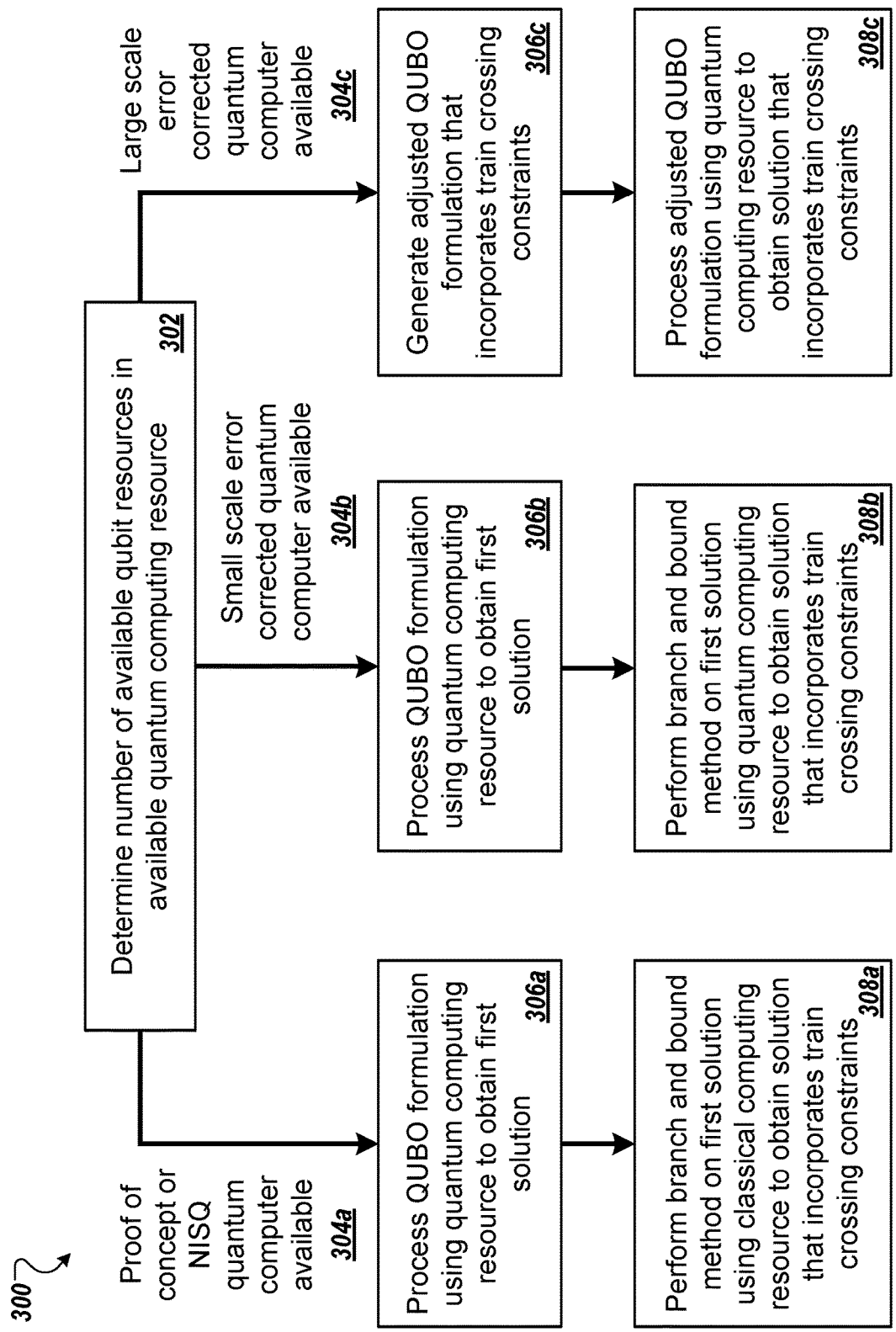
FIG. 3 is a flow diagram of an example process for obtaining a solution to a train and driver recovery problem using different types of quantum computing resources.

FIG. 3 is a flowchart of an example process 300 for obtaining a solution to a train and driver recovery problem using different types of quantum computing resources. For convenience, the process 300 will be described as being performed by a system of one or more classical or quantum computing devices located in one or more locations. For example, example system 100 of FIG. 1, appropriately programmed in accordance with this specification, can perform the process 300.

The system determines a number of available qubit resources in an available local or external quantum computing resource (step 302). For example, in implementations where the system includes classical processors only, the system can query an external quantum computing resource to determine a number of available qubit resources in the external quantum computing resource.

In response to determining that a first number of qubits are available (step 304a), e.g., a relatively low number such as 100-10,000 qubits as is the case in proof of concept devices or some NISQ devices, the system transmits the QUBO formulation of the train and driver recovery problem to the quantum computing resource for processing (step 306a). The system then receives a first solution to the train and driver recovery problem from the quantum computing resource. The system can then use classical computation to perform, based on the obtained first solution, a branch and bound method to obtain a solution to the train and driver recovery problem that incorporates train crossing constraints (step 308a).

In response to determining that a second number (larger than the first number) of qubits are available (step 304b), e.g., a medium range number such as 10,000-10,000,000 qubits as is the case in NISQ devices or small scale error corrected quantum computers, the system transmits the QUBO formulation of the train and driver recovery problem to the quantum computing resource for processing (step 306b). The system then receives a first solution to the train and driver recovery problem from the external or local quantum computing resource. The system can then use the same or another quantum computing resource to perform, based on the obtained first solution, a branch and bound method to obtain a solution to the train and driver recovery problem that incorporates train crossing constraints (step 308b).

In response to determining that a third number (larger than the second number) of qubits are available (step 304c), e.g., >10,000,000 qubits as in a large scale error corrected quantum computer, the system generates an adjusted QUBO formulation of the train and driver recovery problem by incorporating train crossing constraints into the QUBO formulation (step 306c). The system then transmits the adjusted QUBO formulation of the train and driver recovery problem to the quantum computing resource to obtain a solution to the train and driver recovery problem (step 308c).

Figure 4:
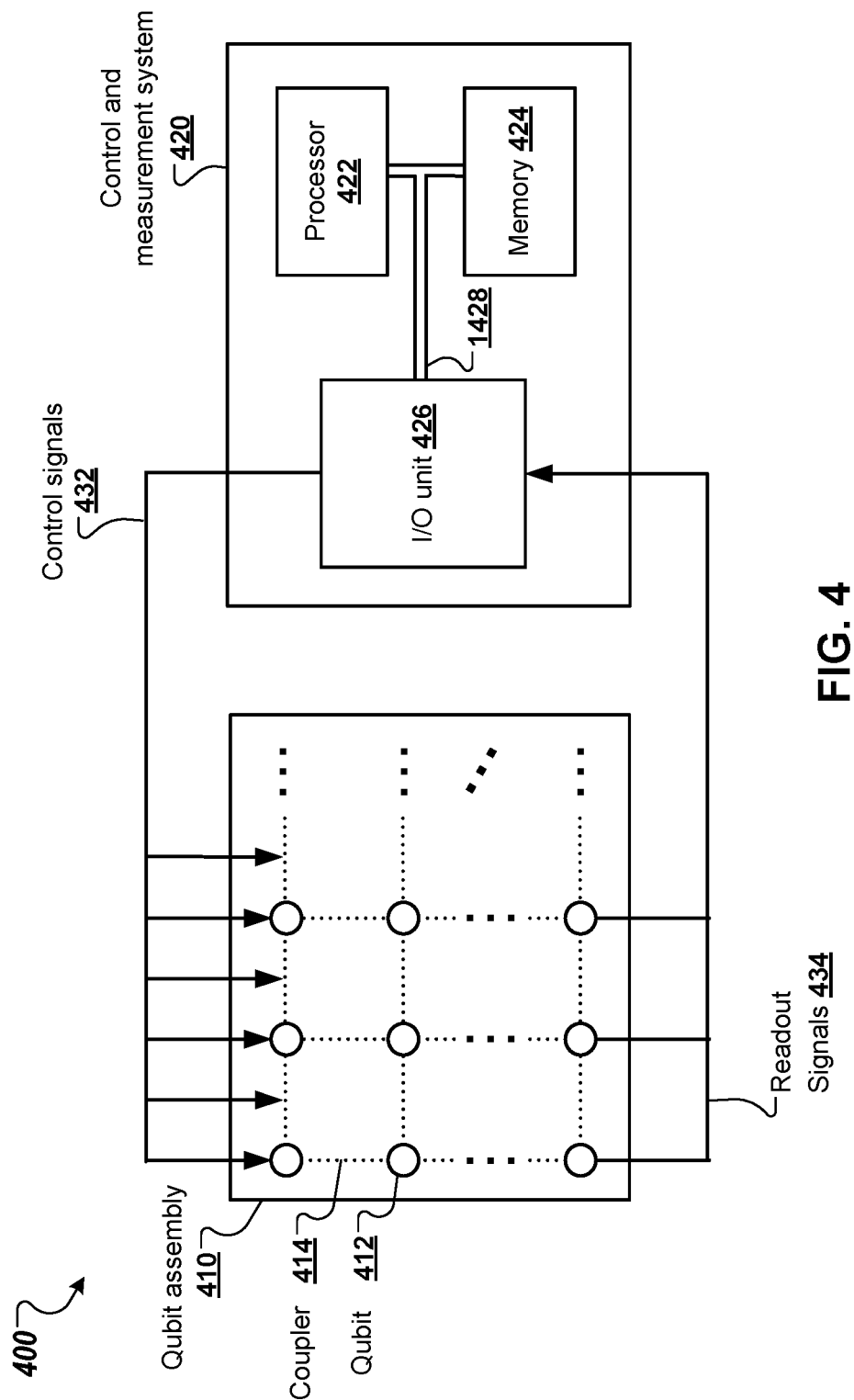
FIG. 4 shows an example an example quantum computing device that can be used to carry out the quantum computing methods described herein.

FIG. 4 is a block diagram of an example quantum computing device 400. The quantum computing device 400 can be used to perform the quantum computation operations described in this specification according to some implementations. The quantum computing device 400 is intended to represent various forms of quantum computing devices. The components shown here, their connections and relationships, and their functions, are exemplary only, and do not limit implementations of the inventions described and/or claimed in this document.

The quantum computing device 400 includes a qubit assembly 410 and a control and measurement system 420. The qubit assembly includes multiple qubits, e.g., qubit 412, that are used to perform algorithmic operations or quantum computations. While the qubits shown in FIG. 4 are arranged in a rectangular array, this is a schematic depiction and is not intended to be limiting. The qubit assembly 410 also includes adjustable coupling elements, e.g., coupler 414, that allow for interactions between coupled qubits. In the schematic depiction of FIG. 4, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 400 or the type of quantum computations that the quantum computing device 400 is performing. For example, in an atomic quantum computer the qubits can be realized via atomic, molecular or solid-state quantum systems, e.g., hyperfine atomic states. As another example, in a superconducting quantum computer the qubits can be realized via superconducting qubits or semi-conducting qubits, e.g., superconducting transmon states. As another example, in a NMR quantum computer the qubits can be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), Hadamard and S gates, two-qubit gates, e.g., controlled-X, controlled-Y, controlled-Z (also referred to as CX, CY, CZ), and gates involving three or more qubits, e.g., Toffoli gates. The quantum logic gates can be implemented by applying control signals 432 generated by the control and measurement system 420 to the qubits and to the couplers.

For example, in some implementations the qubits in the qubit assembly 410 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency can put the qubit into a state where it does not strongly interact with other qubits, and where it can be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions can be performed in order to perform multi-qubit gates.

The type of control signals 432 used depends on the physical realizations of the qubits. For example, the control signals can include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 434. The measurements cause readout signals 434 representing measurement results to be communicated back to the measurement and control system 420. The readout signals 434 can include RF, microwave, or optical signals depending on the physical scheme for the quantum computing device 400 and/or the qubits. For convenience, the control signals 432 and readout signals 434 shown in FIG. 4 are depicted as addressing only selected elements of the qubit assembly (i.e. the top and bottom rows), but during operation the control signals 432 and readout signals 434 can address each element in the qubit assembly 410.

The control and measurement system 420 is an example of a classical computer system that can be used to perform various operations on the qubit assembly 410, as described above. The control and measurement system 420 includes one or more classical processors, e.g., classical processor 422, one or more memories, e.g., memory 424, and one or more I/O units, e.g., I/O unit 426, connected by one or more data buses, e.g., bus 426. The control and measurement system 420 can be programmed to send sequences of control signals 432 to the qubit assembly, e.g. to carry out a selected series of quantum gate operations, and to receive sequences of readout signals 434 from the qubit assembly, e.g. as part of performing measurement operations.

The processor 422 is configured to process instructions for execution within the control and measurement system 420. In some implementations, the processor 422 is a single-threaded processor. In other implementations, the processor 422 is a multi-threaded processor. The processor 422 is capable of processing instructions stored in the memory 424.

The memory 424 stores information within the control and measurement system 420. In some implementations, the memory 424 includes a computer-readable medium, a volatile memory unit, and/or a non-volatile memory unit. In some cases, the memory 424 can include storage devices capable of providing mass storage for the system 420, e.g. a hard disk device, an optical disk device, a storage device that is shared over a network by multiple computing devices (e.g., a cloud storage device), and/or some other large capacity storage device.

The input/output device 426 provides input/output operations for the control and measurement system 420. The input/output device 426 can include D/A converters, A/D converters, and RF/microwave/optical signal generators, transmitters, and receivers, whereby to send control signals 432 to and receive readout signals 434 from the qubit assembly, as appropriate for the physical scheme for the quantum computer. In some implementations, the input/output device 426 can also include one or more network interface devices, e.g., an Ethernet card, a serial communication device, e.g., an RS-232 port, and/or a wireless interface device, e.g., an 802.11 card. In some implementations, the input/output device 1426 can include driver devices configured to receive input data and send output data to other external devices, e.g., keyboard, printer and display devices.

Although an example control and measurement system 420 has been depicted in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 5:
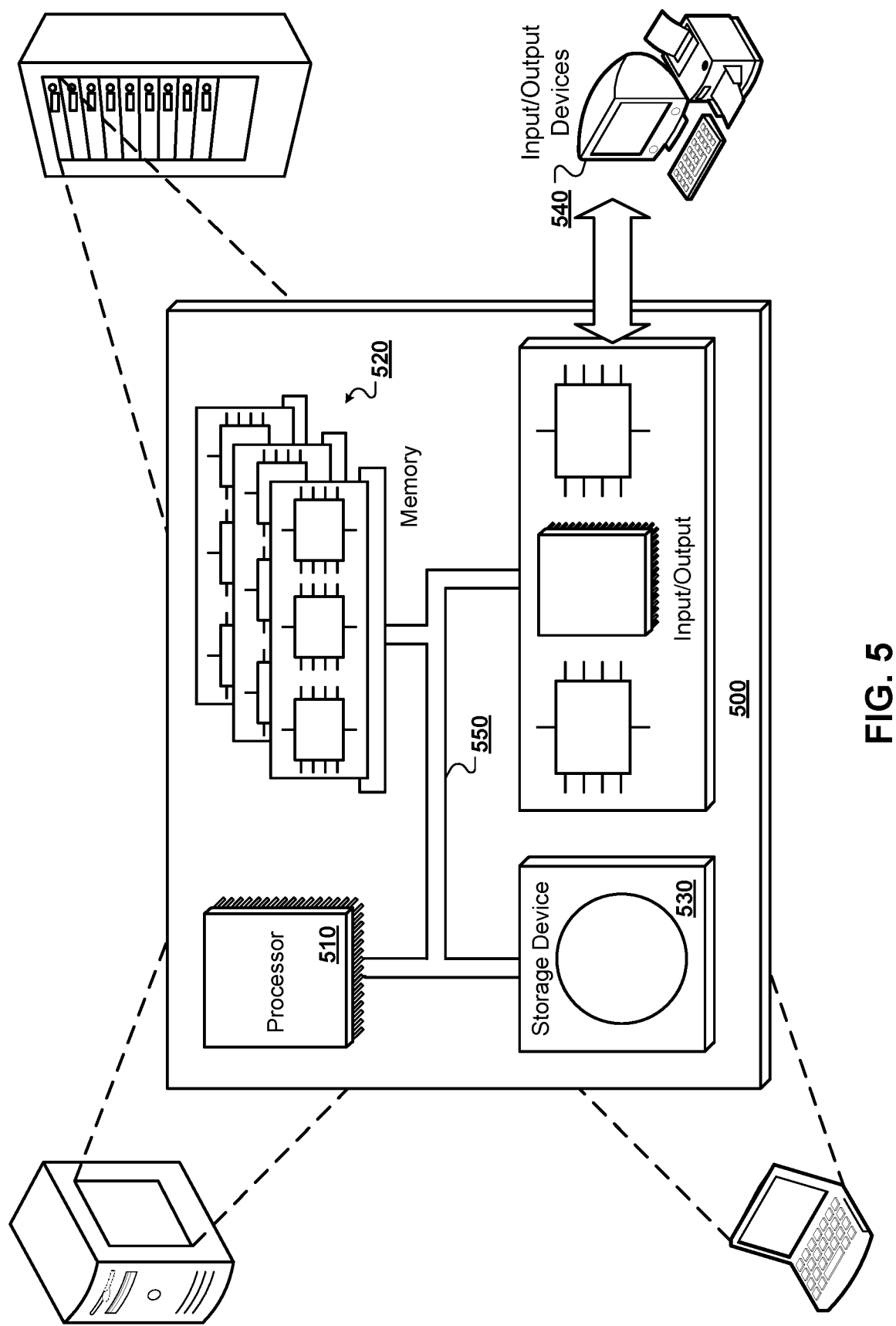
FIG. 5 shows an example classical processor that can be used to carry out the classical computing methods described herein.

FIG. 5 illustrates a schematic diagram of an exemplary generic classical processor system 500. The system 500 can be used for the classical operations described in this specification according to some implementations. The system 500 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 500 includes a processor 510, a memory 520, a storage device 1530, and an input/output device 540. Each of the components 510, 520, 530, and 520 are interconnected using a system bus 550. The processor 510 can be enabled for processing instructions for execution within the system 500. In one implementation, the processor 510 is a single-threaded processor. In another implementation, the processor 510 is a multi-threaded processor. The processor 510 can be enabled for processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 can be enabled for providing mass storage for the system 500. In one implementation, the storage device 530 is a computer-readable medium. In various different implementations, the storage device 530 can be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" can include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that can be suitably approximated as a two-level system in the corresponding context. Such quantum systems can include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus"

refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which can also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that can transmit quantum data using quantum systems, e.g. qubits. Generally, a digital data communication network cannot transmit quantum data, however a quantum data communication network can transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer can receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that can include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving data representing a train and driver recovery problem, wherein the train and driver recovery problem comprises a task of recovering from a disruption to a planned train and driver schedule;
    generating, based on the data representing the train and driver recovery problem, a quadratic unconstrained binary optimization (QUBO) formulation of the train and driver recovery problem, wherein the QUBO formulation excludes variables that relax constraints on driver duties;
    determining a number of available qubit resources;
    processing, using quantum computation performed by a qubit assembly including multiple qubits, in a quantum computing device, the QUBO formulation of the train and driver recovery problem to obtain a first solution to the train and driver recovery problem;
    in response to determining that a first number of qubit resources are available, performing, by classical computation and based on the obtained first solution, a branch and bound method to obtain a solution to the train and driver recovery problem that incorporates train crossing constraints;
    in response to determining that a second number of qubit resources are available, performing, using quantum computation performed by the qubit assembly in the quantum computing device and based on the obtained first solution, the branch and bound method to obtain the solution to the train and driver recovery problem that incorporates train crossing constraints;
    obtaining data representing the solution to the train and driver recovery problem, wherein the data representing the solution to the train and driver recovery problem comprises an adjusted train and driver schedule; and
    initiating an action based on the obtained data representing the solution to the train and driver recovery problem,
        wherein initiating the action comprises:
            transmitting the adjusted train and driver schedule to a railway control system for real time implementation of the adjusted train and driver schedule, and
            operating available trains and available train drivers according to the adjusted train and driver schedule, and
    wherein the first number of qubit resources are 100 to 10000 qubits and the second number of qubit resources are more than 10000 but less than 10000000 qubits.

2. The method of claim 1, wherein the data representing the train and driver recovery problem comprises input data specifying the problem, the input data comprising i) data representing a set of available train drivers, ii) data representing a set of candidate train and driver tasks, iii) data representing a set of available trains, iv) data representing scheduled start times of respective train and driver tasks, and v) data representing durations of scheduled stops for respective trains after completion of respective train tasks.

3. The method of claim 1, wherein the data representing the solution to the train and driver recovery problem comprises i) data representing a set of feasible recovery duties for each available driver and ii) data representing a set of feasible routes and start times for each available train.

4. The method of claim 1, wherein the QUBO formulation of the train and driver recovery problem comprises a QUBO objective function, wherein the QUBO objective function is given by $$\left(x_p^k, x_r^q, t_n^q\right) = \sum_{q \in Q} \sum_{n \in N} \sum_{i=0}^{\lfloor \log_2(t_n^q) \rfloor} c_n^q \left(t_{i,n}^q - t'^{q}_{i,n}\right)^2 * 2^i + \sum_{k \in K} \sum_{p \in P^k} c_p^k \left(x_p^k\right)^2$$

where $c_n^q$ represents an associated cost of task $n \in N$ with train $q \in Q$, $t_{i,n}^q$ represents an i-th bit of a binary representation of a start time $t_n^q$ of task n with train q, $t'^{q}_{i,n}$ represents an i-th bit of a binary representation of a disrupted start time $t'^{q}_n$ of task n with train q, $c_p^k$ represents an associated cost of duty $p \in P^k$ for driver $k \in K$ and $x_p^k \in \{0, 1\}$ is an optimization variable for a duty $p \in P^k$ assigned to driver $k \in K$.

5. The method of claim 1, wherein the QUBO formulation of the train and driver recovery problem comprises one or more penalty terms, the one or more penalty terms comprising a first penalty term that penalizes solutions to the train and driver recovery problem that assign each train driver more than one recovery duty.

6. The method of claim 5, wherein the first penalty term comprises a first penalty factor multiplied by a square of i) one minus ii) a sum, over a set of feasible recovery duties for each available driver, of binary decision variables for duty p assigned to driver k, wherein the first penalty factor is larger than an upper bound of a corresponding QUBO objective function.

7. The method of claim 1, wherein the QUBO formulation of the train and driver recovery problem comprises one or more penalty terms, the one or more penalty terms comprising a second penalty term that penalizes solutions to the train and driver recovery problem that assign train tasks without a driver.

8. The method of claim 7, wherein the second penalty term is given by $$H_{M_{NP}} = M_{NP} \sum_{n \in N} \left(1 - \sum_{k \in K} \sum_{p \in P^k} \alpha_{np}^k x_p^k\right)^2$$

where $M_{NP}$ represents a second penalty factor is larger than an upper bound of a corresponding QUBO objective function, $\alpha_{np}^k \in {0, 1}$ represents a parameter that tracks whether task $n \in N$ is covered by duty p of driver k, and $x_p^k \in \{0, 1\}$ is an optimization variable for a duty $p \in P^k$ assigned to driver $k \in K$.

9. The method of claim 1, wherein the QUBO formulation of the train and driver recovery problem comprises one or more penalty terms, the one or more penalty terms comprising a third penalty term that penalizes solutions to the train and driver recovery problem that allow, for a same train and particular task, a start time for a next task to be earlier than i) an end time for the particular task plus ii) a predetermined stop duration.

10. The method of claim 9, wherein the third penalty term comprises a third penalty factor multiplied by a square of i) the start time for the next task, minus ii) a slack variable, minus iii) the end time for the particular task, minus iv) the predetermined stop duration.

11. The method of claim 1, wherein the QUBO formulation of the train and driver recovery problem comprises one or more penalty terms, the one or more penalty terms comprising a fourth penalty term that penalizes solutions to the train and driver recovery problem that include one or more train tasks with start times that are not later than a previously scheduled start time of a previous task plus a duration of the previous task and a predefined idling duration.

12. The method of claim 11, wherein the fourth penalty term comprises a fourth penalty factor multiplied by a square of i) the start time for the next task, minus ii) a start time for a current task, minus iii) a slack variable, minus iv) a duration of the current task, minus iv) a predetermined stop duration.

13. The method of claim 1, wherein the QUBO formulation of the train and driver recovery problem comprises one or more penalty terms, the one or more penalty terms comprising a sixth penalty term that penalize solutions to the train and driver recovery problem that that include, for a task that requires a locomotive exchange between trains during the task, a start time for a second train that is not later than i) a scheduled start time of the task with a first train plus ii) a duration of the task with the first train plus iii) a predefined idling duration plus iv) a time taken to exchange locomotives.

14. The method of claim 13, wherein the sixth penalty term comprises a sixth penalty factor multiplied by a square of i) a start time for a second train, minus ii) a start time for the first train, minus iii) a slack variable, minus iv) a duration of the task with the first train, minus v) the predefined idling duration, minus vi) the time taken to exchange locomotives.

15. The method of claim 1, further comprising:
in response to determining that a third number of qubit resources are available:
generating adjusted QUBO formulation of the train and driver recovery problem incorporating train crossing constraints in the QUBO formulation of the train and driver recovery problem, and
processing, by quantum computation, the adjusted QUBO formulation of the train and driver recovery problem to obtain the solution to the train and driver recovery problem.

16. The method of claim 1, wherein the QUBO formulation of the train and driver recovery problem comprises a QUBO objective function, wherein the QUBO objective function is given by $$\min_{x_k^p \in \{0,1\}} \sum_{k \in K} \sum_{p \in P_k} x_k^p \left(C_{k,p}^{(1)} + \sum_{\substack{n \in N \\ n \in p}} C_{n,k,p}^{(2)} T_{n,k,p}^{(D)}\right) +$$

$$P_1 \sum_{k \in K} \left(\sum_{p \in P_k} x_k^p - 1\right)^2 + P_2 \sum_{n \in N} \left(\sum_{k \in K} \sum_{\substack{p \in P_k \\ n \in p}} x_k^p - 1\right)^2$$

where $P_1$, $P_2 >> 0$ represent penalty constants for penalty terms, K represents a set of available train drivers, N represents a set of tasks that is to be operated by drivers in K, $P_k$ represents a set of feasible recovery duties for driver $k \in K$, in which a recovery duty $p \in P_k$ is a unique subset of tasks in N that can be operated by driver k, $C_{k,p}^{(1)}$ represents an associated cost of assigning driver $k \in K$ to duty $p \in P_k$, $T_{n,k,p}^{(D)} \in T$ represents a delay of task $n \in N$, conditioned on the task being operated by driver $k \in K$ that is being assigned duty $p \in P_k$, in which $n \in p$, $C_{n,k,p}^{(2)}$ represents a cost of task $n \in N$ operated by driver $k \in K$ that is being assigned duty $p \in P_k$ in which $n \in p$, and $x_k^p \in \{0,1\}$ is a binary variable, where $k \in K$ and $p \in P_k$.

17. A system comprising one or more computers and one or more storage devices storing instructions that are operable, when executed by the one or more computers, to cause the one or more computers to perform operations comprising:
receiving data representing a train and driver recovery problem, wherein the train and driver recovery problem comprises a task of recovering from a disruption to a planned train and driver schedule;
generating, based on the data representing the train and driver recovery problem, a quadratic unconstrained binary optimization (QUBO) formulation of the train and driver recovery problem, wherein the QUBO formulation excludes variables that relax constraints on driver duties;
determining a number of available qubit resources;
processing, using quantum computation performed by a qubit assembly including multiple qubits, in a quantum computing device, the QUBO formulation of the train and driver recovery problem to obtain a first solution to the train and driver recovery problem;
in response to determining that a first number of qubit resources are available, performing, by classical computation and based on the obtained first solution, a branch and bound method to obtain a solution to the train and driver recovery problem that incorporates train crossing constraints;
in response to determining that a second number of qubit resources are available, performing, using quantum computation performed by the qubit assembly in the quantum computing device and based on the obtained first solution, the branch and bound method to obtain the solution to the train and driver recovery problem that incorporates train crossing constraints;

obtaining data representing the solution to the train and driver recovery problem, wherein the data representing the solution to the train and driver recovery problem comprises an adjusted train and driver schedule; and initiating an action based on the obtained data representing a solution to the train and driver recovery problem, wherein initiating the action comprises:

transmitting the adjusted train and driver schedule to a railway control system for real time implementation of the adjusted train and driver schedule, and operating available trains and available train drivers according to the adjusted train and driver schedule, and wherein the first number of qubit resources are 100 to 10000 qubits and the second number of qubit resources are more than 10000 but less than 10000000 qubits.

\* \* \* \* \*